US012766528B2

(12) United States Patent
Meng

(10) Patent No.: US 12,766,528 B2
(45) Date of Patent: Oct. 20, 2026

(54) IRRIGATION SPRAYING DEVICE

(71) Applicant: YUYAO DINGZHAN INSERT PLASTIC & FITTING CO., LTD, Yuyao (CN)

(72) Inventor: Jiandi Meng, Yuyao City (CN)

(73) Assignee: YUYAO DINGZHAN INSERT PLASTIC & FITTING CO., LTD, Yuyao (CN)

( * ) Notice: Subject to any disclaimer, the term of this patent is extended or adjusted under 35 U.S.C. 154(b) by 383 days.

(21) Appl. No.: 18/241,336

(22) Filed: Sep. 1, 2023

(65) Prior Publication Data

US 2024/0131536 A1 Apr. 25, 2024
US 2024/0226926 A9 Jul. 11, 2024

(30) Foreign Application Priority Data

Oct. 19, 2022 (CN) ........................ 202222750795.0

(51) Int. Cl.

*B05B 15/622* (2018.01)
*B05B 1/26* (2006.01)
*B05B 15/658* (2018.01)

(52) U.S. Cl.

CPC ............ *B05B 1/262* (2013.01); *B05B 15/622* (2018.02); *B05B 15/658* (2018.02)

(58) Field of Classification Search

CPC .......... A01G 25/02; A01G 25/06; B05D 1/02; B05B 15/60; B05B 15/622
See application file for complete search history.

(56) References Cited

U.S. PATENT DOCUMENTS

| | | | | | |
|---|---|---|---|---|---|
| 4,365,750 | A * | 12/1982 | Carlberg | .............. | A01G 25/023 239/458 |
| 9,439,365 | B2 * | 9/2016 | Lo | .......................... | A01G 25/02 |
| 11,480,275 | B2 * | 10/2022 | Lin | .......................... | F16L 25/14 |
| 2011/0000976 | A1 * | 1/2011 | Roide | .................... | A01G 25/02 239/11 |
| 2019/0141916 | A1 * | 5/2019 | Auguste | ................. | A01G 25/06 239/201 |

* cited by examiner

*Primary Examiner* — Devon C Kramer
*Assistant Examiner* — Sean V Meiller
(74) *Attorney, Agent, or Firm* — WPAT, PC

(57) ABSTRACT

An irrigation spraying device includes: a tee joint, a ground picket, a spraying head and two quick connectors. The spraying head is disposed at a top portion of the tee joint; the two quick connectors are disposed on two sides of the tee joint respectively; and a top portion of the ground picket is provided with an engaging portion, which includes two clips matched with two ends of the tee joint respectively. The device can achieve spray irrigation through hanging, can adapt to various irrigation scenes, improves its adaptability, and is simple in structure, convenient to operate, and suitable for popularization and application. A setting of the clips enables a rotation of the tee joint to realize angle adjustment of the spraying head, thereby adjusting the angle of the spraying head during ground irrigation, further improving the adaptability of the device to meet needs of various irrigation scenes.

10 Claims, 10 Drawing Sheets

IRRIGATION SPRAYING DEVICE

TECHNICAL FIELD

The disclosure relates to the field of irrigating technology, particularly to an irrigation spraying device.

BACKGROUND

In a related art, a micro-irrigation system is generally used for irrigation in gardens or orchards, and the micro-irrigation system is used for providing a permanent or semi-permanent watering equipment used in the gardens, the orchards, etc. The micro-irrigation system in the related art is generally difficult to install, prone to detaching from a tube during use, and not easy to replace. Furthermore, a large number of different products are needed to establish a relatively simple micro-irrigation system, resulting in the trouble of coordination between products, and mostly can be used in a single irrigation scene, which is of great inconvenience.

Chinese utility model patent publication No. CN214126354U discloses an irrigation spraying device. The irrigation spraying device includes a tabulate base, a plurality of mounting holes are arranged on the base, an embedded pipe is fixed at a center of the bottom of the base, a corrugated pipe is vertically arranged at a center of the top of the base, and the top of the corrugated pipe is vertically communicated with a supporting pipe. A plurality of irrigation pipes are vertically and evenly arranged on a side surface of the supporting pipe, a valve is installed on each of the irrigation pipes, and a spraying head is installed at an end of each of the irrigation pipes. However, the irrigation spraying device has a single application scenario and is inconvenient to install and use.

SUMMARY

Technical Problem to be Solved

The disclosure provides an irrigation spraying device in view of the above described deficiencies in the related art. Therefore, the disclosure solves the problems in the related art that the existing irrigation spraying devices are difficult to install and replace, and have single irrigation function.

Technical Solution

In order to solve the above technical problems, the disclosure provides an irrigation spraying device, including a tee joint, a ground picket, a spraying head, and two quick connectors. The spraying head is disposed on a top portion of the tee joint and configured to spray water for irrigation.

The two quick connectors are disposed on two sides of the tee joint respectively and configured to be connected with water hoses respectively.

A top portion of the ground picket is provided with an engaging portion configured to connect to the tee joint, the engaging portion includes at least one clip, a top end of each of the at least one clip is open, and the ground picket is configured to be connected with the tee joint through the at least one clip.

In an embodiment of the disclosure, a shape of the ground picket is of a conical plate-shaped structure and two sides of the ground picket are provided with reinforcing ribs.

In an embodiment of the disclosure, each of the two quick connectors includes a sealing ring, a fixing part, and a snap cover; the snap cover is defined with a through hole matched with the fixing part, and the sealing ring is sleeved in the snap cover; the fixing part includes a snap ring configured to connect with the water hose, and elastic snap claws; and the snap claws are disposed around an axis of the snap ring.

In an embodiment of the disclosure, the spraying head is in threaded fit with the tee joint.

In an embodiment of the disclosure, the irrigation spraying device further includes an adjusting part disposed between the spraying head and the tee joint, the adjusting part is sleeved in the spraying head, the adjusting part is disposed with an elastic structure, and the adjusting part is defined with a plurality of water outlet grooves.

In an embodiment of the disclosure, the irrigation spraying device further includes a connecting part disposed between the spraying head and the tee joint, the connecting part is provided with a mounting end configured to connect with the tee joint and a threaded end configured to connect with the spraying head.

In an embodiment of the disclosure, a side edge of the spraying head is provided with a plurality of water outlets disposed around a central line of the spraying head.

Beneficial Effect

Compared with the related art, the disclosure adopts a split design between the engaging portion of the ground picket and the tee joint, thereby making the irrigation spraying device of the disclosure hung through the tee joint disassembling the ground picket, and meanwhile, making the device inserted in the ground for ground irrigation through the tee joint assembling the ground picket. Therefore, the irrigation spraying device provided by the disclosure can adapt to the various irrigation scenes and improves its adaptability. Moreover, the irrigation spraying device has a simple structure and a low price; and the setting of the semicircle-shaped clips makes the tee joint capable of being rotated to realize angle adjustment of the spraying head disposed on the top portion of the tee joint, and then to adjust spraying angle of the spraying head during the ground irrigation, further improving the adaptability of the device to meet the needs of various irrigation scenes.

DESCRIPTION OF REFERENCE NUMERALS

Figure 1:
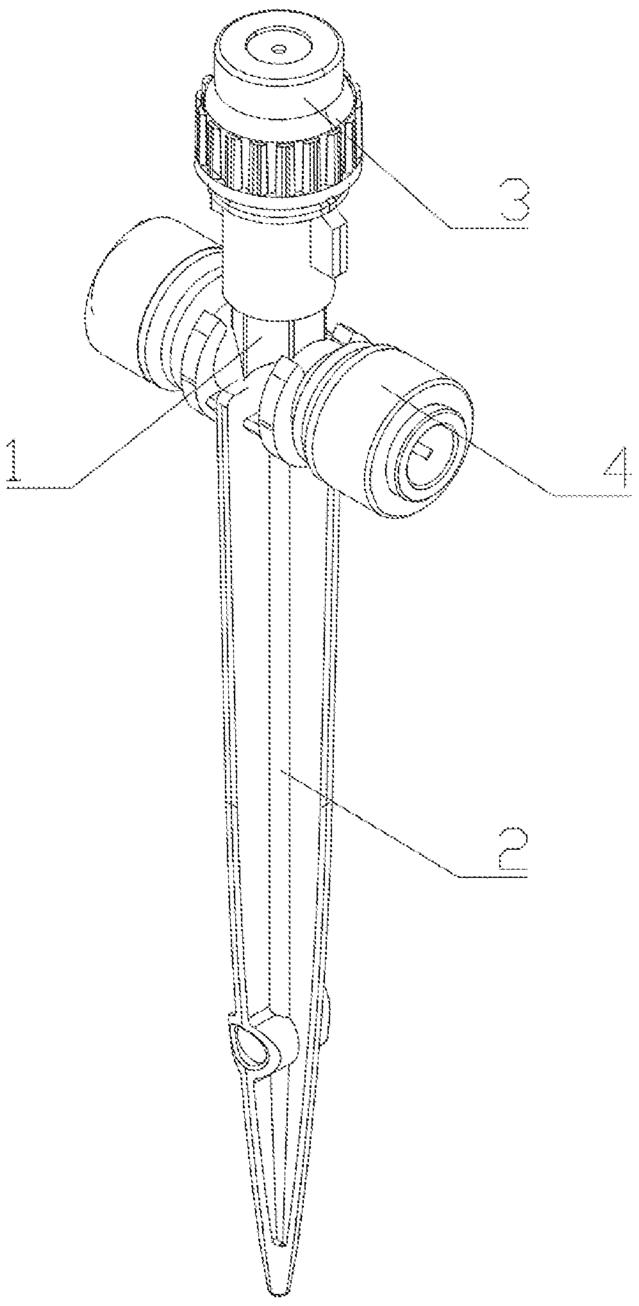
FIG. 1 illustrates a schematic overall perspective structural view of an irrigation spraying device according to an embodiment of the disclosure.

- 1—tee joint;
- 2—ground picket; 21—engaging portion; 211—clip; 22—reinforcing rib;
- 3—spraying head; 31—adjusting part; 311—water outlet groove; 32—connecting part; 33—water outlet; 321—mounting end; 322—threaded end;
- 4—quick connector; 41—sealing ring; 42—fixing part; 421—snap ring; 422—snap claw; 43—snap cover; 431—through hole.

DETAILED DESCRIPTION OF EMBODIMENTS

Implementation manner of the disclosure will be described in further detail below with reference to attached drawings and embodiments. The following embodiments are used to illustrate the disclosure, but cannot be used to limit the scope of the disclosure.

Embodiment 1

As shown in FIG. 1 to FIG. 7, an irrigation spraying device in the embodiment 1 includes a tee joint 1, a ground picket 2, a spraying head 3, and two quick connectors 4. The spraying head 3 is disposed on a top portion of the tee joint 1 and used to spray water for irrigation. The two quick connectors 4 are located on two sides of the tee joint 1 respectively, and the two quick connectors 4 are both used for quick connection with water hoses respectively. A top portion of the ground picket 2 is provided with an engaging portion 21 for connecting with the tee joint 1, the engaging portion 21 includes at least one clip 211, a top end of the clip 211 is open, and the ground picket 2 can be connected with the tee joint 1 through the clip 211.

The disclosure provides a split design between the engaging portion 21 of the ground picket 2 and the tee joint 1, thereby making the irrigation spraying device of the disclosure hung through the tee joint 1 disassembling the ground picket 2, and meanwhile, making the irrigation spraying device of the disclosure inserted in the ground for ground irrigation through the tee joint 1 assembling the ground picket 2. Therefore, the device is suitable for various irrigation scenes, thereby improving an adaptability of the disclosure. Furthermore, the disclosure is simple in structure and has a low price. Moreover, the top end of the clip 211 is open to connect with the tee joint 1, which realizes a quick connection between the tee joint 1 and the corresponding clip for convenient disassembly and installation of the tee joint 1. In addition, by rotating the tee joint 1 within the clip 211, the angle of the spraying head 3 located at the top portion of the tee joint 1 can be adjusted to achieve the angle adjustment of the spraying head 3 for ground irrigation, which further improves the adaptability of the device and meets the needs of various irrigation scenes. In an illustrated embodiment of the disclosure, a number of the clips 211 are two, thereby making the clips 211 connect with the tee joint 1 more stably. Therefore, when the irrigation spraying device of the disclosure is used for the ground irrigation, a plurality of water hoses are connected through the tee joint 1, and the ground picket 2 is used to support the tee joint 1 or make the tee joint 1 hung, thereby realizing a rapid construction of the irrigation spraying device.

Figure 2:
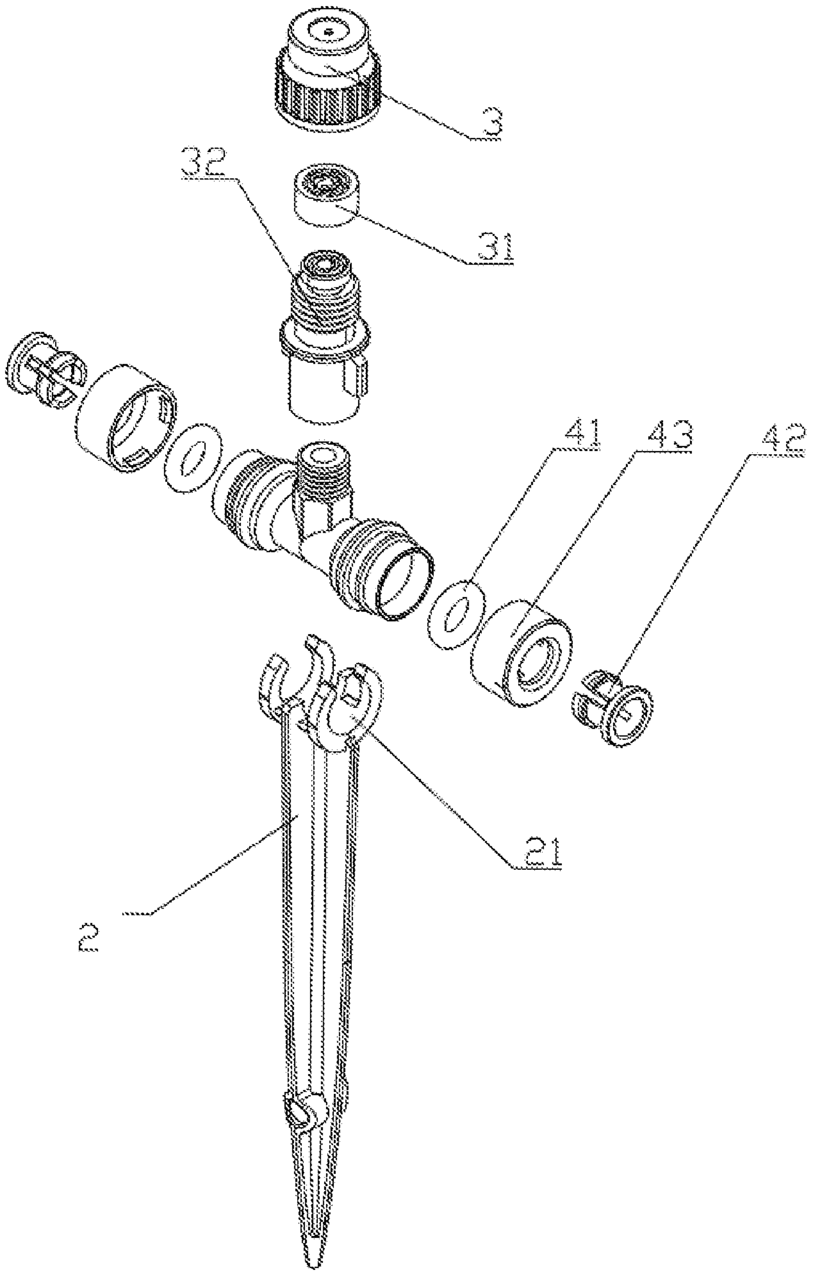
FIG. 2 illustrates a schematic exploded structural view of the irrigation spraying device.
Figure 4:
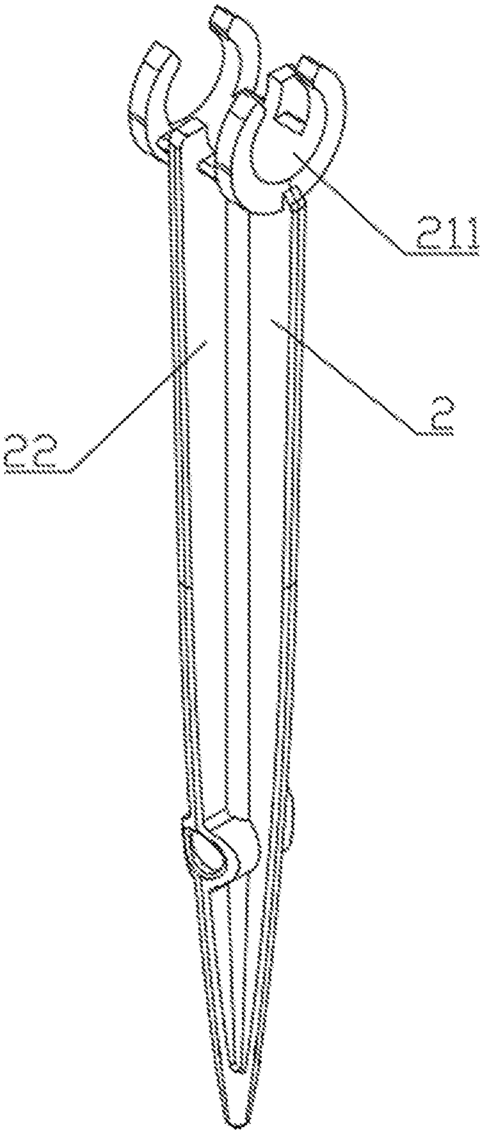
FIG. 4 illustrates a schematic perspective structural view of a ground picket of the irrigation spraying device.

As shown in FIG. 1, FIG. 2 and FIG. 4, a shape of the ground picket 2 is of a conical plate-shaped structure, and two sides of the ground picket are provided with reinforcing ribs 22.

Through the setting of the conical plate-shaped structure of the ground picket 2, the ground picket 2 is more easily inserted into the ground, and the reinforcing ribs 22 on the two sides are used for strengthen the overall structure of the ground picket 2, thereby improving the stability of the ground picket 2 and prolonging the service life of the ground picket 2.

Figure 6:
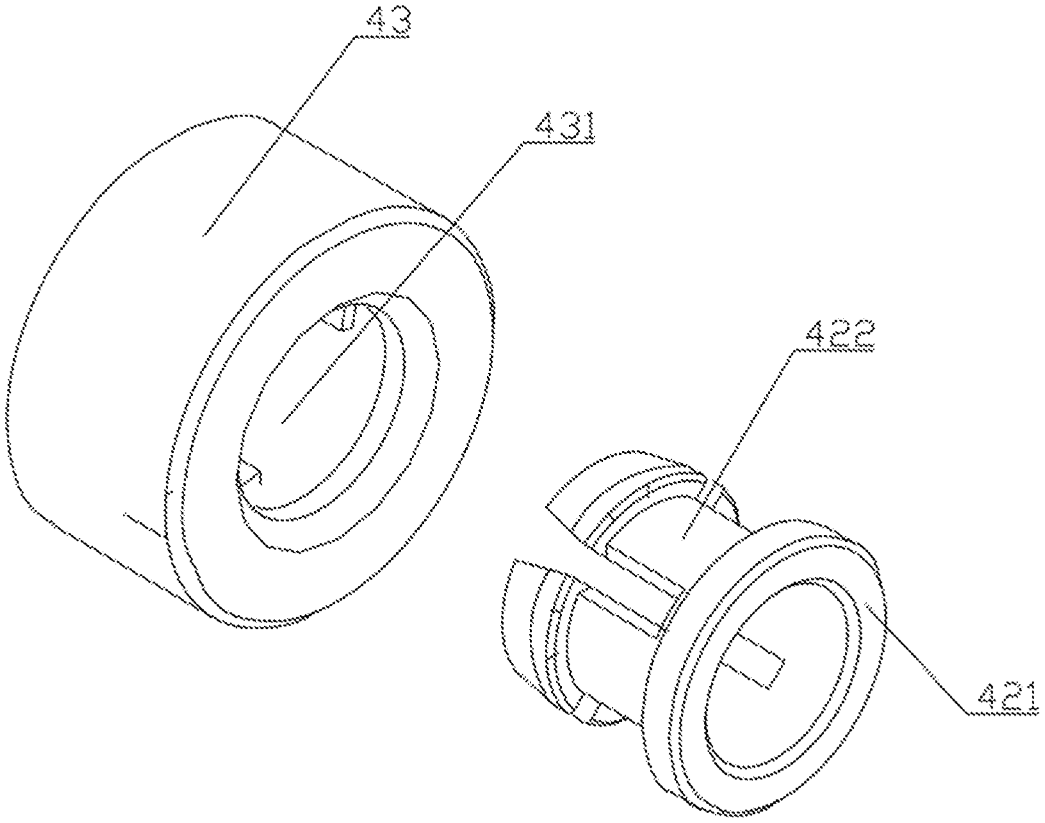
FIG. 6 illustrates a schematic perspective structural view of a snap cover and a fixing part of the irrigation spraying device.
Figure 7:
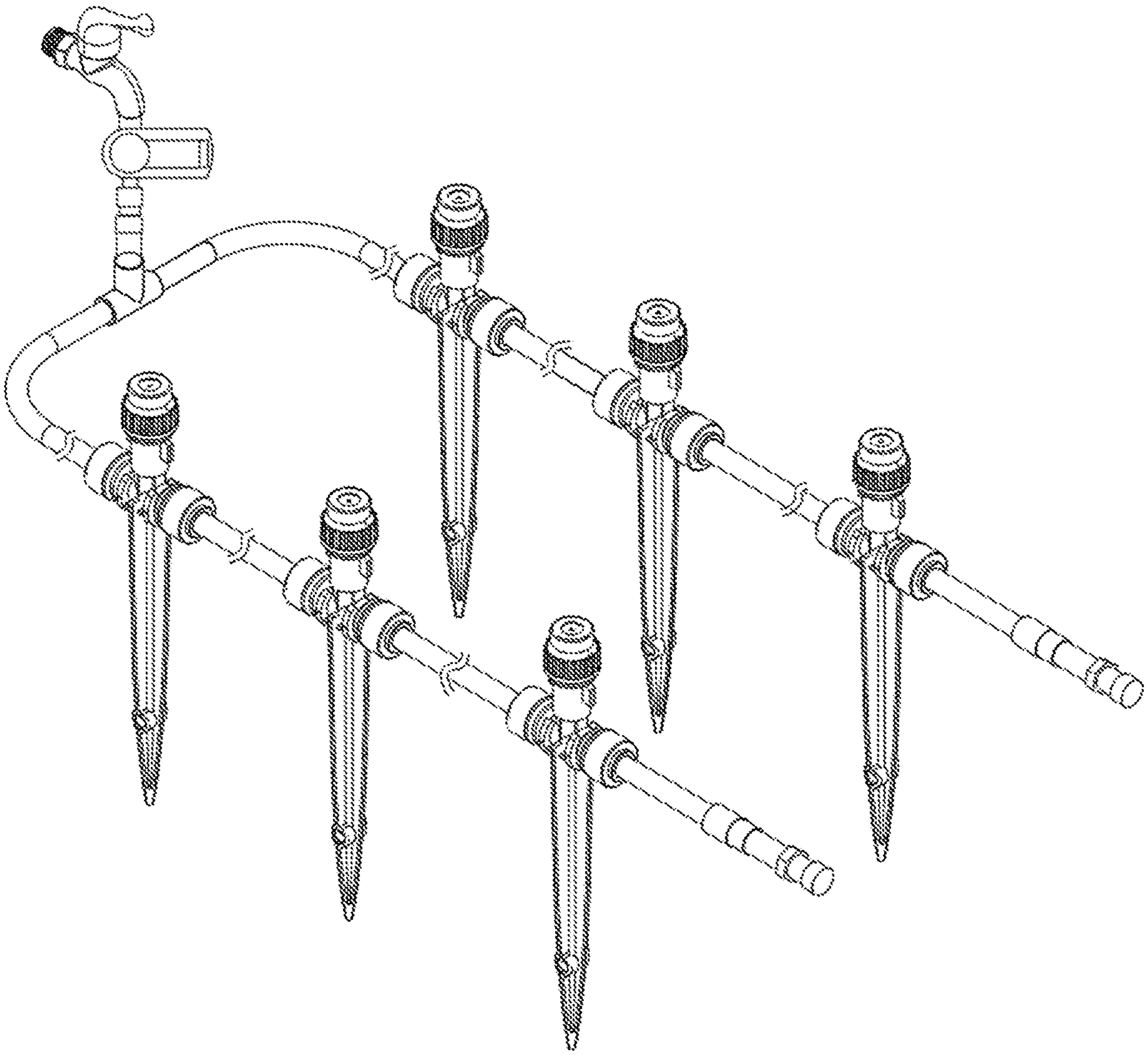
FIG. 7 illustrates a schematic diagram of installation of a plurality of irrigation spraying devices.

As shown in FIG. 2 and FIG. 6, each of the two quick connectors 4 includes: a sealing ring 41, a fixing part 42, and a snap cover 43. The snap cover 43 is defined with a through hole 431 matched with the fixing part 42, and the sealing ring 41 is sleeved in the snap cover 43. The fixing part 42 includes a snap ring 421 configured to connect with the water hose and a plurality of elastic snap claws 422. The elastic snap claws 422 are disposed around an axis of the snap ring 421.

When the tee joint 1 needs to be connected with the water hoses, an end of each of the water hoses is sleeved inside the snap ring 421 of the fixing part 42, and then a side of the snap ring 421 provided with the snap claws 422 is inserted into the through hole 431 of the snap cover 43. Then, the snap cover 43 is rotated to realize the connection with the tee joint 1. When the snap cover 43 is tightly connected with the tee joint 1, it will drive the elastic snap claws 422 to move closer to the axis of the snap ring 421. The movement of the elastic snap claws 422 drives the water hose to fit with the tee joint 1, thereby fixing the water hose on the tee joint 1 through the snap claws 422. Furthermore, the setting of the sealing ring 41 improves the sealing effect between the tee joint 1 and the water hose, thereby ensuring that there is no leakage when water flows through the tee joint 1.

Figure 9:
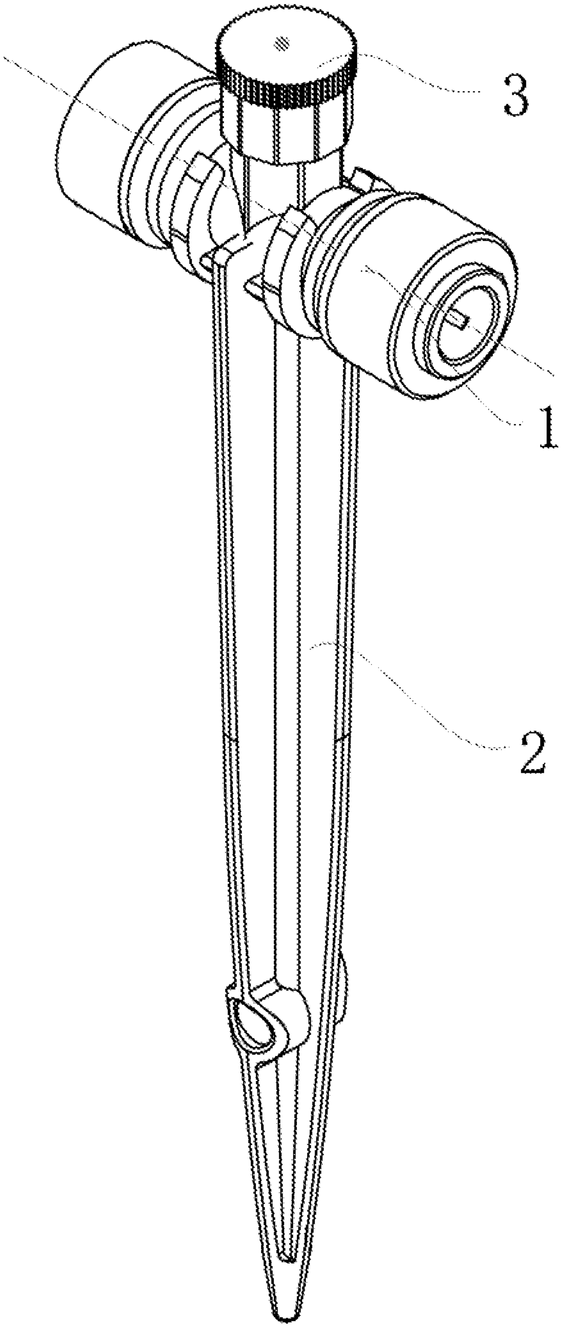
FIG. 9 illustrates a schematic perspective structural view of an irrigation spraying device without being installed with the adjusting part.
Figure 10:
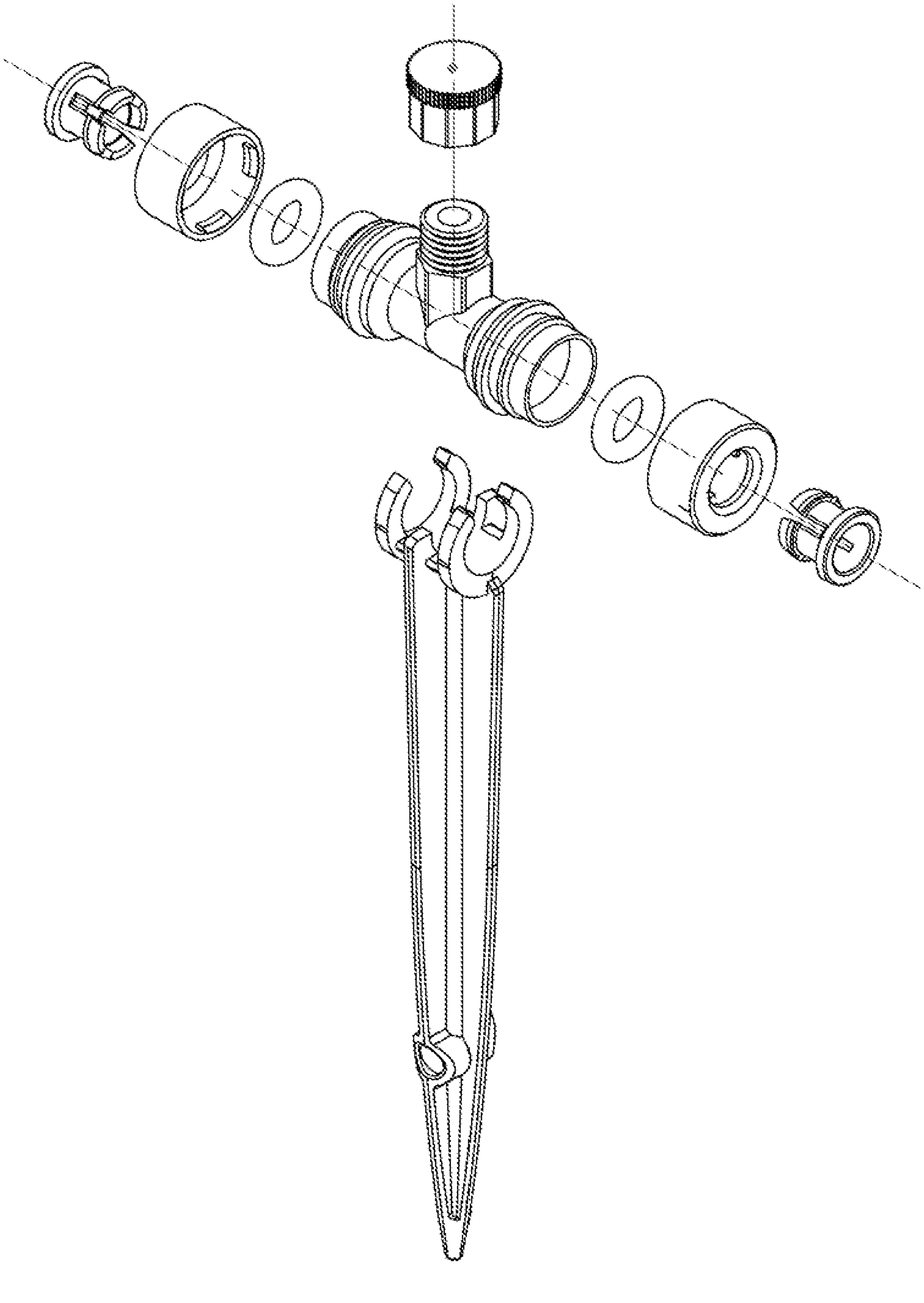
FIG. 10 illustrates a schematic exploded structural view of the irrigation spraying device without being installed with the adjusting part.

As shown in FIG. 9 and FIG. 10, the spraying head 3 is in direct threaded fit with the tee joint 1. The setting of the threaded fit between the spraying head 3 and the tee joint 1 makes the spraying head 3 capable of freely replaced according to different irrigation scenes, thereby further improving the adaptability of the device provided by the disclosure.

Figure 3:
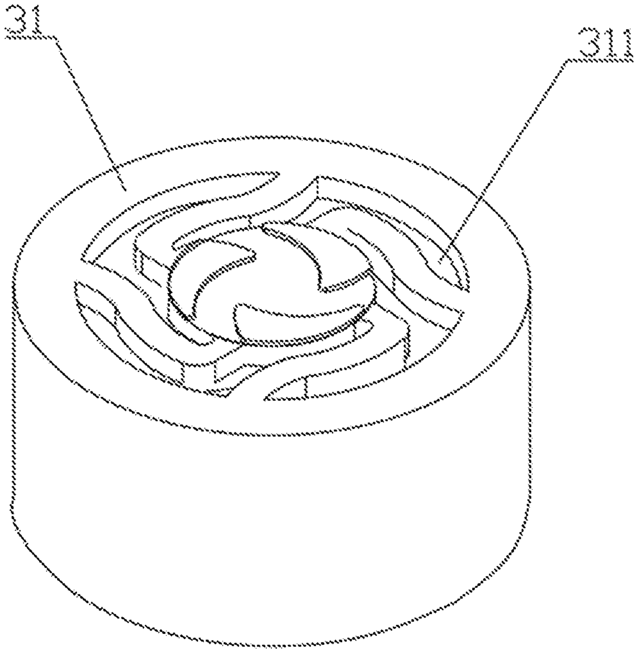
FIG. 3 illustrates a schematic perspective structural view of an adjusting part of the irrigation spraying device.

As shown in FIG. 2 and FIG. 3, an adjusting part 31 is disposed between the spraying head 3 and the tee joint 1, the adjusting part 31 is sleeved in the spraying head 3, the adjusting part 31 is disposed with an elastic structure, and the adjusting part 31 is defined with a plurality of water outlet grooves 311.

Through the setting of the adjusting part 31, when the spraying head 3 is connected with the tee joint 1 more tightly through rotation, the spraying head 3 will occlude the water outlet grooves 311 defined on the adjusting part 31. In an illustrated embodiment, due to that the adjusting part 31 is disposed with the elastic structure, the adjusting part 31 is made of a silicone material, so that the water outlet grooves 311 are capable of deforming along with various pressure, and then a water outlet amount of the spraying head 3 is adjusted to meet the use of different irrigation scenes, thereby further improving the adaptability of the device.

Figure 5:
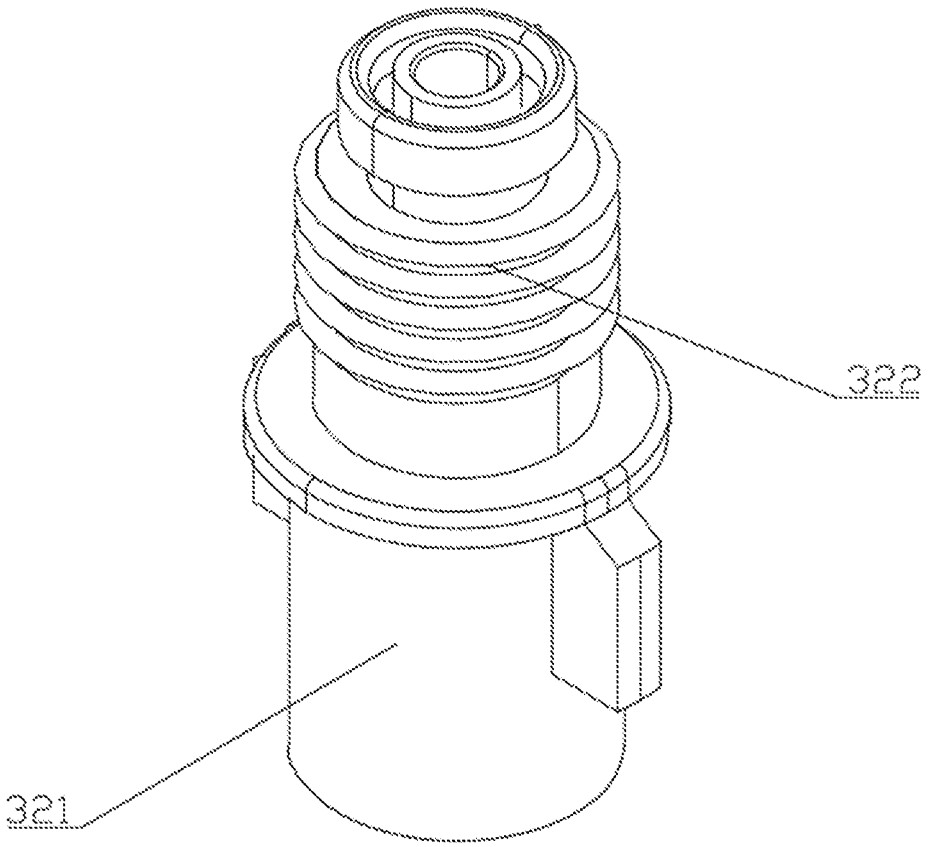
FIG. 5 illustrates a schematic perspective structural view of a connecting part of the irrigation spraying device.

As shown in FIG. 2 and FIG. 5, a connecting part 32 is further provided between the spraying head 3 and the tee joint 1, and the connecting part 32 is provided with a mounting end 321 configured to connect with the tee joint 1 and a threaded end 322 configured to connect with the spraying head 3.

Considering that there are various types of the spraying head 3 in the market, the disclosure is provided with the mounting end 321 of the connecting part 32 to be connected with the tee joint 1, thereby facilitating the connection between the spraying head 3 and the tee joint 1, and then the threaded end 322 of the connecting part 32 is connected with the spraying head 3 to satisfy the connection between the irrigation spraying device provided by the disclosure and the various types of the spraying head 3.

Embodiment 2

Figure 8:
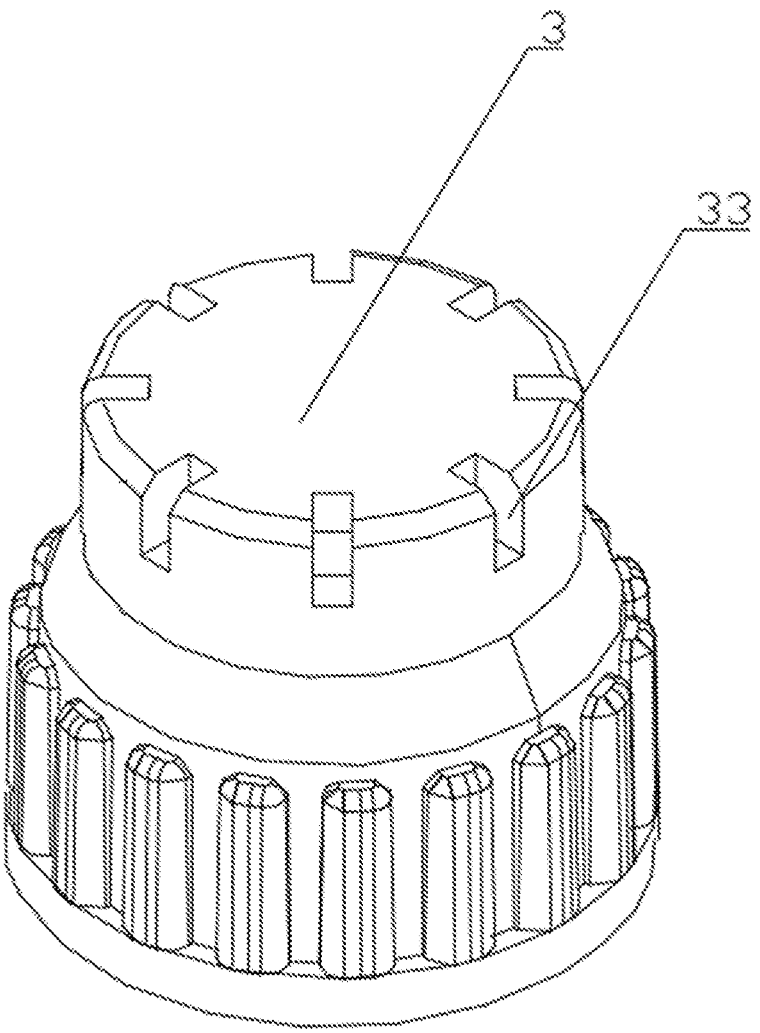
FIG. 8 illustrates a schematic perspective structural view of a spraying head of the irrigation spraying device.

Compared with the embodiment 1, as shown in FIG. 8, in the embodiment 2, a side edge of a spraying head 3 is provided with a plurality of water outlets 33 disposed around a central line of the spraying head 3. The setting of the plurality of water outlets 33 realizes that the spraying head 3 can spray water to a peripheral side of the spraying head 3, thereby satisfying multiple irrigation scenes.

What is claimed is:

1. An irrigation spraying device, comprising: a tee joint (1), a ground picket (2), a spraying head (3), and two quick connectors (4);

wherein the spraying head (3) is disposed on a top portion of the tee joint (1) and configured to spray water for irrigation;

wherein the two quick connectors (4) are disposed on two sides of the tee joint (1) respectively and configured to be connected with a water hose;

wherein a top portion of the ground picket (2) is provided with an engaging portion (21) configured to detachably connect with the tee joint (1), the engaging portion (21) comprises two clips (211), a top end of each of the two clips (211) is opened to obtain two openings, the tee joint (1) is engaged into the two clips (211) through the two openings and is configured to be rotatable within the two clips (211), and the ground picket (2) is configured to be detachably connected with the tee joint (1) through the two clips (211); and wherein the two clips (211) are arranged at opposite sides of the top portion of the tee joint (1) along a central axis of the two quick connectors (4).

2. The irrigation spraying device according to claim 1, wherein a shape of the ground picket (2) is a conical plate-shaped structure, and two sides of the ground picket (2) are provided with reinforcing ribs (22).

3. The irrigation spraying device according to claim 1, wherein each of the two quick connectors (4) comprises: a sealing ring (41), a fixing part (42), and a snap cover (43); the snap cover (43) is defined with a through hole (431) matched with the fixing part (42), and the sealing ring (41) is sleeved in the snap cover (43); the fixing part (42) comprises a snap ring (421) configured to connect with the water hose, and elastic snap claws (422) extending from the snap ring (421) to the tee joint (1); and the snap claws (422) are disposed around an axis of the snap ring (421) and configured to be inserted in the through hole (431) of the snap cover (43).

4. The irrigation spraying device according to claim 1, wherein the spraying head (3) is in a threaded fit with the tee joint (1).

5. The irrigation spraying device according to claim 4, further comprising an adjusting part (31) disposed between the spraying head (3) and the tee joint (1), wherein the adjusting part (31) is a cylindrical structure and is sleeved in the spraying head (3), the adjusting part (31) is disposed with an elastic structure and is made of a silicone material, the adjusting part (31) is defined with a plurality of water outlet grooves (311), and when the spraying head (3) is connected with the tee joint (1), the spraying head (3) is configured to occlude the plurality of water outlet grooves (311) defined on the adjusting part (31) to adjust a water outlet amount of the spraying head (3).

6. The irrigation spraying device according to claim 4, further comprising a connecting part (32) disposed between the spraying head (3) and the tee joint (1); wherein the connecting part (32) is provided with a mounting end (321) configured to connect with the tee joint (1), and a threaded end (322) configured to connect with the spraying head (3).

7. The irrigation spraying device according to claim 1, wherein a side edge of the spraying head (3) is provided with a plurality of water outlets (33) disposed around a central line of the spraying head (3).

8. An irrigation spraying device, comprising:

a tee joint (1);

a ground picket (2), wherein the ground picket (2) comprises an engaging portion (21), and the tee joint (1) is detachably engageable with the ground picket (2) through the engaging portion (21); and the engaging portion (21) comprises two clips (211), and the two clips (211) are arranged at opposite sides of a top portion of the tee joint (1) along a central axis of two quick connectors (4); and a top end of each of the two clips (211) is opened to obtain two openings respectively, the tee joint (1) is engaged into the two clips (211) through the two openings and is configured to be rotatable within the two clips (211), and the ground picket (2) is configured to be detachably connected with the tee joint (1) through the two clips (211);

a spraying head (3), detachably connected on the tee joint (1); and the quick connectors (4), detachably connected on two sides of the tee joint (1) respectively;

wherein each of the quick connectors (4) comprises: a sealing ring (41), a fixing part (42), and a snap cover (43);

wherein the sealing ring (41) is configured to sleeve in the snap cover (43);

wherein the fixing part (42) comprises a snap ring (421) configured to connect with a water hose, and a plurality of snap claws (422) extending from the snap ring (421) to the tee joint (1), and the plurality of snap claws (422) are configured to be driven close to an axis of the snap ring (421) during tightening a connection of the snap cover (43) with the tee joint (1) in a situation that an end of the water hose is sleeved in the snap ring (421) and the plurality of snap claws (422) are inserted in a through hole (431) of the snap cover (43), thereby making the water hose fit with the tee joint (1).

9. The irrigation spraying device according to claim 8, further comprising an adjusting part (31) disposed between the spraying head (3) and the tee joint (1), wherein the adjusting part (31) is a cylindrical structure and is sleeved in the spraying head (3), the adjusting part (31) is disposed with an elastic structure and is made of a silicone material, the adjusting part (31) is defined with a plurality of water outlet grooves (311), and when the spraying head (3) is connected with the tee joint (1), the spraying head (3) is configured to occlude the plurality of water outlet grooves (311) defined on the adjusting part (31) to adjust a water outlet amount of the spraying head (3).

10. The irrigation spraying device according to claim 9, further comprising a connecting part (32) disposed between the adjusting part (31) and the tee joint (1); wherein the connecting part (32) is provided with a mounting end (321)

configured to connect with the tee joint (1), and a threaded end (322) configured to connect with the spraying head (3).

* * * * *